(12) United States Patent
Jung et al.

(10) Patent No.: US 11,031,821 B2
(45) Date of Patent: *Jun. 8, 2021

(54) WIRELESS POWER TRANSMISSION DEVICE

(71) Applicant: GE Hybrid Technologies, LLC, Niskayuna, NY (US)

(72) Inventors: Chun Kil Jung, Seoul (KR); Hak Do Kim, Suwon-si (KR)

(73) Assignee: GE Hybrid Technologies, LLC, Niskayuna, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/710,161

(22) Filed: Dec. 11, 2019

(65) Prior Publication Data

US 2020/0169118 A1    May 28, 2020

Related U.S. Application Data

(63) Continuation of application No. 15/544,024, filed as application No. PCT/KR2016/000466 on Jan. 15, 2016, now Pat. No. 10,541,563.

(Continued)

(51) Int. Cl.
*H01F 38/14* (2006.01)
*H02J 50/12* (2016.01)
(Continued)

(52) U.S. Cl.
CPC .............. *H02J 50/12* (2016.02); *H01F 38/14* (2013.01); *H02J 50/40* (2016.02); *H04B 5/0037* (2013.01); *H04B 5/0075* (2013.01); *H04B 5/0081* (2013.01)

(58) Field of Classification Search
CPC .......... G01R 19/00; H01F 38/14; H02J 7/025; H02J 50/10; H02J 50/12; H02J 50/40;
(Continued)

(56) References Cited

U.S. PATENT DOCUMENTS 9,124,307 B2 *   9/2015   Kudo ..................... H02J 50/12
9,306,636 B2 *   4/2016   Kwon .................... H02J 50/60
(Continued)

FOREIGN PATENT DOCUMENTS

JP      2010259204      11/2010
JP      2013220010      10/2013
(Continued)

OTHER PUBLICATIONS

"PCT Application No. PCT/KR2016/000466 International Preliminary Report on Patentability", dated Jul. 27, 2017, 13 pages.
(Continued)

*Primary Examiner* — William Hernandez
(74) *Attorney, Agent, or Firm* — DeLizio Law, PLLC

(57) ABSTRACT

The present specification relates to a wireless power transmission device. The present specification provides a wireless power transmission device comprising: a power supply unit for supplying power to the wireless power transmission device; at least one first coil for transmitting power to a wireless power reception device; and first and second condensers configured so as to be connected respectively to different both ends of the power supply unit and the first coil.

16 Claims, 5 Drawing Sheets

Related U.S. Application Data

(60) Provisional application No. 62/104,094, filed on Jan. 16, 2015.

(51) Int. Cl.
*H04B 5/00* (2006.01)
*H02J 50/40* (2016.01)

(58) Field of Classification Search
CPC .. H04B 5/0037; H04B 5/0075; H04B 5/0081; H04B 5/0087; H04B 5/0093
USPC ......................................................... 307/104
See application file for complete search history.

(56) References Cited

U.S. PATENT DOCUMENTS

| | | | |
|---|---|---|---|
| 2011/0148215 | A1 | 6/2011 | Marzetta et al. |
| 2013/0241301 | A1 | 9/2013 | Maeda et al. |
| 2013/0285464 | A1 | 10/2013 | Miwa et al. |
| 2013/0342161 | A1* | 12/2013 | Byun ...................... H02J 7/025 320/108 |
| 2015/0236518 | A1* | 8/2015 | Matsumoto ............. H02J 7/025 307/104 |
| 2016/0172894 | A1 | 6/2016 | Khripkov et al. |
| 2016/0197494 | A1* | 7/2016 | Kwon ...................... H02J 5/005 307/104 |
| 2016/0260541 | A1 | 9/2016 | Yuasa |
| 2017/0317529 | A1* | 11/2017 | Smith ...................... H02J 50/10 |
| 2018/0159376 | A1 | 6/2018 | Jung et al. |

FOREIGN PATENT DOCUMENTS

| | | |
|---|---|---|
| JP | 2013243908 | 12/2013 |
| JP | 2014124021 | 7/2014 |
| KR | 1020130099152 | 9/2013 |
| WO | 2013042570 | 3/2013 |
| WO | 2016114629 | 7/2016 |

OTHER PUBLICATIONS

"PCT Application No. PCT/KR2016/000466 International Search Report", dated May 13, 2016, 2 pages.
"Qi System Description Wireless Power Transfer", Wireless Power Consortium, vol. 1:Low Power, Part 1:Interface Definition, Version 1.0.1, Oct. 2010, 88 pages.
"U.S. Appl. No. 15/544,024 Office Action", dated Apr. 29, 2019, 9 pages.

* cited by examiner

WIRELESS POWER TRANSMISSION DEVICE

CROSS-REFERENCE TO RELATED APPLICATIONS

This application is a continuation U.S. patent application Ser. No. 15/544,024, filed Nov. 21, 2017, which is a national stage of International Application No. PCT/KR2016/000466, filed Jan. 15, 2016, which claims the benefit of priority to U.S. Provisional Application No. 62/104,094, filed Jan. 16, 2015, the disclosures of which are incorporated herein by reference.

BACKGROUND OF THE INVENTION

Field of the Invention

The present invention relates to wireless charging and, more particularly, to a wireless power transmission apparatus.

Related Art

The wireless power transfer technology is a technology that wirelessly delivers power between a power source and an electronic device. For example, the wireless power transfer technology enables a battery of a wireless terminal to be charged by simply placing a wireless terminal such as a smart phone or a tablet on a wireless charging pad. Thus, compared to a wired charging environment using a typical wired charging connector, the mobility, convenience, and safety can be improved. In addition to wireless charging of wireless terminals, the wireless power transfer technology is attracting attention as a substitute for the existing wired power transfer environment in various fields such as electric vehicles, wearable devices such as Bluetooth earphones or 3D glasses, home appliances, furniture, underground facilities, buildings, medical devices, robots, and leisure.

The wireless power transfer method is also referred to as a contactless power transfer method, a no point of contact power transfer method, or a wireless charging method. The wireless power transfer system includes a wireless power transmission apparatus for supplying electric energy by a wireless power transfer method and a wireless power reception apparatus for receiving electric energy wirelessly supplied from the wireless power transmission apparatus and supplying power to a power receiving device such as a battery cell.

The wireless power transfer technologies are largely classified into a magnetic induction method and a magnetic resonance method. In the magnetic induction method, energy is transmitted using a current induced at a receiving side coil due to a magnetic field generated in a coil battery cell at a transmitting side in accordance with electromagnetic coupling between a coil at the transmitting side and a coil at the receiving side. The magnetic induction type of wireless power transfer technology has an advantage of high transmission efficiency, but has limitations in that the power transfer distance is limited to several millimeters and the degrees of the location freedom is significantly low due to sensitivity to matching between coils.

The magnetic resonance method is similar to the magnetic induction method in that both methods use a magnetic field. However, in the magnetic resonance method, a resonance occurs when a specific resonance frequency is applied to the coil at the transmission side and the coil at the reception side, and thus energy is transferred by a phenomenon that the magnetic field is focused on both ends of the transmission side and the reception side, which differs from magnetic induction method in terms of energy transfer. Due to these characteristics of magnetic resonance, power can be remotely transmitted unlike magnetic induction. The magnetic resonance method may transmit energy up to a relatively long distance of several tens of centimeters to several meters compared to the magnetic induction method, and enables power transmission to a plurality of devices at the same time. Thus, the magnetic resonance method is expected to be a wireless power transfer technology to implement real cord-free devices.

SUMMARY OF THE INVENTION

The present invention provides a wireless power transmission apparatus which efficiently reduces a carrier power with respect to power transmitted to a wireless power reception apparatus in a contactless charging system.

In an aspect, a wireless power transmission apparatus is provided. The wireless power transmission apparatus includes: a power supply unit for supplying power to the wireless power transmission apparatus; at least one primary coil for transmitting power to a wireless power reception apparatus; and first and second condensers configured to be connected to both ends of the power supply unit and the primary coil, respectively.

The first and second condensers may be configured to reduce a reflected power applied from the wireless power reception apparatus to the power supply unit as power is transmitted from the primary coil to the wireless power reception apparatus.

The wireless power transmission apparatus may further include a detection circuit that measures a current or a voltage flowing in the primary coil.

The detection circuit may receive power data from the wireless power reception apparatus, and generate a control signal for controlling the power supply unit based on the power data and the current or voltage flowing in the primary coil.

The wireless power transmission apparatus may further include third and fourth condensers disposed at both ends of the detection circuit or the primary coil and applying a required signal to the detection circuit.

The wireless power transmission apparatus may further include first and second grounds connected to both ends of the inductor.

The wireless power transmission apparatus may further include: a fifth condenser connected between the inductor and the first ground; and a sixth condenser connected between the inductor and the second ground.

The fifth and sixth condensers may be configured to reduce noise due to a voltage applied to the other condensers.

In another aspect, a wireless power transmission method using a wireless power transmission apparatus is provided. The wireless power transmission method includes: generating power necessary for transmitting wireless power by a power source; transmitting wireless power to a wireless power reception apparatus; and attenuating reflection power reflected from the wireless power reception apparatus.

The transmitting of the wireless power may include transmitting power by at least one primary coil.

The attenuating of the reflection power may include reducing the reflection power applied to the power source by first and second condensers disposed at both ends of the primary coil.

The wireless power transmission method may further include measuring a current or voltage flowing in a primary coil by a detection circuit.

The measuring of the current or voltage may include receiving power data from the wireless power reception apparatus, and generating a control signal for controlling the power source based on the power data and the current or voltage flowing in the primary coil.

The measuring of the current or voltage may include applying a required signal to the detection circuit by third and fourth condensers disposed at both ends of the detection circuit and the primary coil.

First and second grounds may be connected to both ends of the inductor, a fifth condenser may be connected between the inductor and the first ground, and a sixth condenser may be connected between the inductor and the second ground to reduce noise due to a voltage applied to the first and second condensers.

According to an embodiment of the present invention, a carrier power with respect to power transmitted to a wireless power reception apparatus in a contactless charging system can be efficiently reduced.

DESCRIPTION OF EXEMPLARY EMBODIMENTS

The term 'wireless power' below is used to mean any type of energy associated with an electric field, a magnetic field, and an electromagnetic field transmitted from a wireless power transmission apparatus to a wireless power reception apparatus without the use of physical electromagnetic conductors. The wireless power may also be referred to as a power signal or wireless energy, and may denote an oscillating magnetic flux enclosed by the primary and secondary coils. For example, power conversion in a system to wirelessly charge devices including mobile phones, cordless phones, iPods, MP3 players, headsets and the like will be described herein. In this disclosure, the basic principles of wireless power transmission include, for example, both magnetic induction coupling and magnetic resonance coupling that uses frequencies of less than 30 MHz. However, various frequencies at which license-exempt operations at relatively high radiation levels, for example, less than 135 kHz (LF) or at 13.56 MHz (HF) are allowed may be used.

Figure 1:
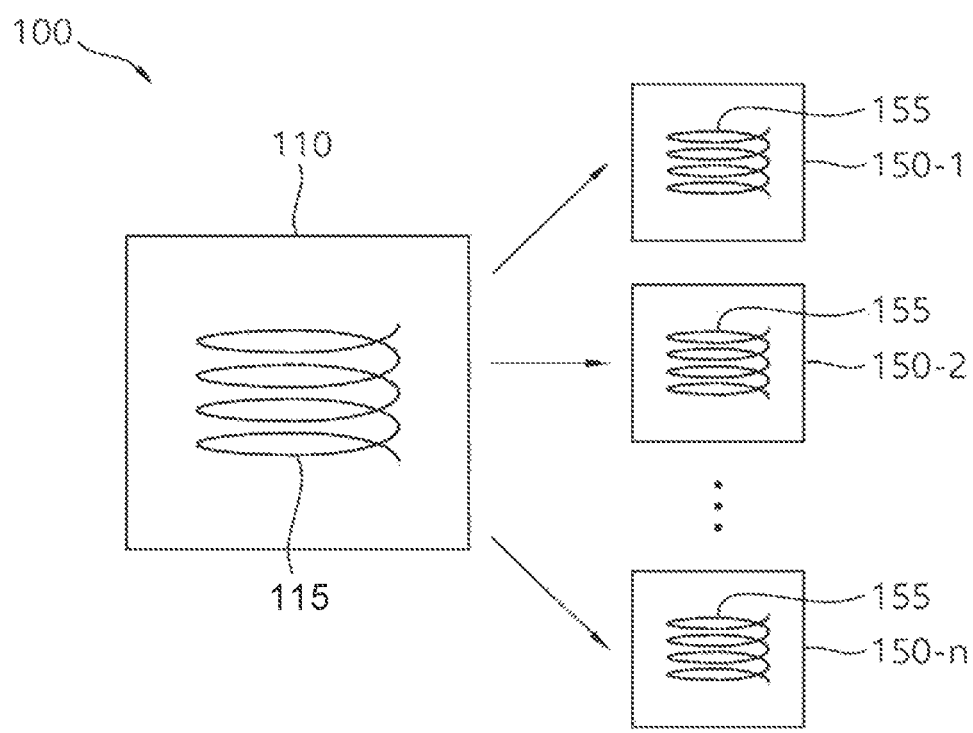
FIG. 1 a view illustrating components of a wireless power transfer system according to an embodiment of the present invention.

FIG. 1 a view illustrating components of a wireless power transfer system according to an embodiment of the present invention.

Referring to FIG. 1, a wireless power transfer system 100 may include a wireless power transmission apparatus 110 and one wireless power reception apparatus 150-1 or n wireless power reception apparatuses 150-1 to 150-*n*.

The wireless power transmission apparatus 110 includes a primary core. The primary core may include one or more primary coils 115. The primary core may further include at least one capacitor coupled to the primary coil 115. The wireless power transmission apparatus 110 may have any suitable form, but one preferred form is a flat platform with a power transfer surface. Here, each of the wireless power reception apparatuses 150-1 to 150-*n* may be located on the platform or therearound.

The wireless power reception apparatuses 150-1 to 150-*n* are detachable from the wireless power transmission apparatus 110, and each of the wireless power reception apparatuses 150-1 to 150-*n* includes a secondary core coupled with an electromagnetic field generated by the primary core of the wireless power transmission apparatus 110 when being close to the wireless power transmission apparatus 110. The secondary core may include one or more secondary coils 155. The secondary core may further include at least one capacitor coupled to the secondary coil 155.

The wireless power transmission apparatus 110 transmits power to the wireless power reception apparatuses 150-1 to 150-*n* without direct electrical contact. In this case, the primary core and the secondary core are referred to as being magnetic-induction-coupled or magnetic-resonance-coupled to each other. The primary coil 115 or the secondary coil 125 may have any suitable shape, but may be a copper wire wound around a formation having a high permeability, such ferrite or amorphous metal.

The wireless power reception apparatuses 150-1 to 150-*n* are connected to an external load (not shown, here, also referred to as an actual load of the wireless power reception apparatus), and supply power wirelessly received from the wireless power transmission apparatus 110 to the external load. For example, the wireless power reception apparatuses 150-1 to 150-*n* may each carry received power to an object that consumes or stores power, such as a portable electric or electronic device, or a rechargeable battery cell or battery.

Figure 2:
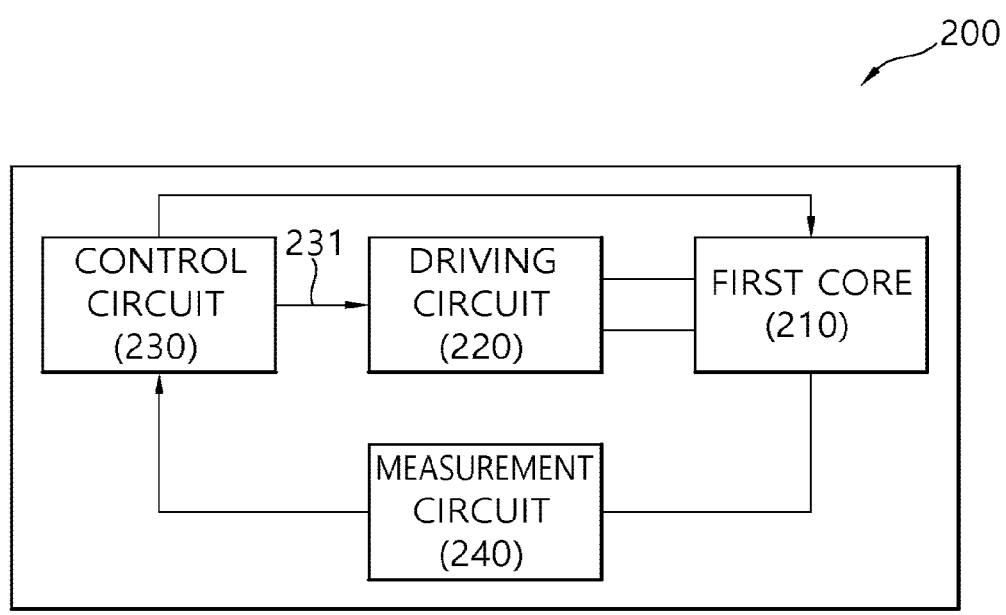
FIG. 2 is a view illustrating a wireless power transmission apparatus according to an embodiment of the present invention.

FIG. 2 is a view illustrating a wireless power transmission apparatus according to an embodiment of the present invention.

Referring to FIG. 2, a wireless power transmission apparatus 200 includes a primary core 210, a driving circuit 220, a control circuit 230, and a measurement circuit 240.

The primary core 210 includes at least one primary coil. For example, the primary core 210 may include at least one primary resonant coil and at least one primary inductive coil. Thus, the resonant coil and the inductive coil may be included in a single core or a single wireless power transmission apparatus as a single module, which can be called a hybrid type. In the hybrid type, the primary resonant coil is a coil used to transmit wireless power to the wireless power reception apparatus by magnetic resonance coupling, and the primary inductive coil is a coil used to transmit wireless power to the wireless power reception apparatus by magnetic induction coupling. In this case, the primary core 210 may further include a capacitor coupled to the primary resonant coil so as to form a magnetic resonance with the primary resonant coil. The magnetic induction method may be used to supply or transmit the corresponding power when the primary core 210 transmits wireless power by the magnetic resonance method. Accordingly, the primary inductive coil may also be referred to as a drive coil.

The primary core 210 includes a plurality of primary coils, at least one capacitor coupled to the plurality of primary coils, and at least one switch (not shown) that performs switching of the plurality of primary coils. The primary core 210 generates an electromagnetic field according to a driving signal applied from the driving circuit 220, and transmits wireless power to the wireless power reception apparatus through the electromagnetic field.

The driving circuit 220 is connected to the primary core 210, and applies driving signals to the primary core 210.

The control circuit 230 is connected to the driving circuit 220, and generates a control signal 231 that controls an AC signal required when the primary core 210 generates an induction magnetic field or incurs a magnetic resonance. The control circuit 230, as a sort of processor, may include Application-Specific Integrated Circuits (ASICs), other chip sets, logic circuits and/or data processing devices.

Also, the control circuit 230 may be connected to the primary core 210 to provide a control signal for controlling a switch of the primary core 210. Particularly, when the primary coil included in the primary core 210 is a hybrid type, the control circuit 230 may perform an operation for driving a hybrid type of coil.

The measurement circuit 240 measures a current or a voltage flowing in the primary coil. In particular, the current measured by the measurement circuit 240 may be an alternating current. The measurement circuit 240 may be a current sensor or a voltage sensor. Alternatively, the measurement circuit 240 may lower a high current flowing in the primary coil to a low current for use, or may be a transformer that lowers a high voltage applied to the primary coil to a low voltage.

Although not shown in the drawings, the wireless power transmission apparatus 200 may further include at least one of a storage device and a communication module wirelessly exchanging data with the wireless power reception apparatus. The communication module may include a Radio Frequency (RF) antenna for transmitting or receiving a signal and a circuit for processing a wireless signal. The storage device may include disk drives, Read-Only Memories (ROMs), Random Access Memories (RAMs), flash memories, memory cards, and storage media.

Figure 3:
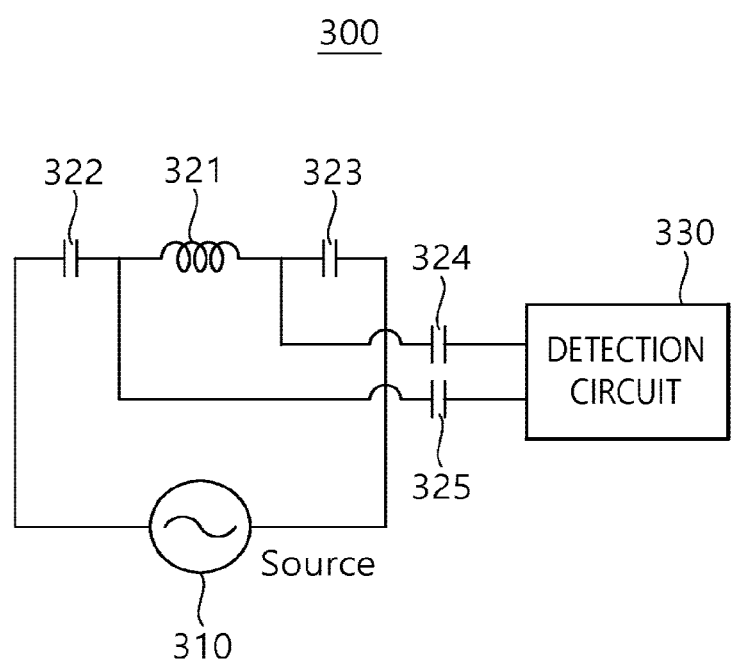
FIG. 3 is a view illustrating a wireless power transmission apparatus according to another embodiment of the present invention.

FIG. 3 is a view illustrating a wireless power transmission apparatus 300 according to another embodiment of the present invention. The wireless power transmission apparatus 300 may constitute a part of the wireless power transmission apparatus 200 shown in FIG. 2. Referring to FIG. 3, the wireless power transmission apparatus 300 may include a power supply unit 310, an inductor 321, first to fourth condensers 322, 323, 324, and 325, and a detection circuit 330.

The power supply unit 310 supplies power necessary for driving the wireless power transmission apparatus 300. The supplied power may be an Alternating Current (AC) or an AC voltage.

The inductor 321 may correspond to the primary coil constituting the primary core 210 shown in FIG. 2, or may constitute a part of the primary core 210. Meanwhile, the first to fourth condensers 322, 323, 324, and 325 may be defined as first to fourth capacitors.

Referring to FIG. 3, the first condenser 322 and the second condenser 323 are configured in opposite directions to each other between the inductor 321 and the power supply unit 310. In other words, the first and second condensers 322 and 323 may be configured at both ends of the inductor 321 or at both ends of the power supply unit 310. The first condenser 322 and the second condenser 323 may have the same capacitance, or may have different capacitances.

The inductor 321, the first condenser 322, and the second condenser 323 may constitute a resonance antenna. In this case, the resonance frequency of the resonance antenna is determined by the inductance of the inductor 321 and the capacitance(s) of the first condenser 322 and the second condenser 323.

Meanwhile, the third condenser 324 and the fourth condenser 325 may also be used to constitute a resonance antenna. In this case, the resonance frequency of the resonance antenna is determined by the inductance of the inductor 321 and the capacitances of the first to fourth condensers 322, 323, 324, and 325.

The power transmission of the wireless power transmission apparatus 300 may be achieved through a resonance phenomenon of a magnetic field. The resonance phenomenon refers to a phenomenon in which when a near-field corresponding to the resonance frequency is generated in one resonance antenna and another resonance antenna is located therearound, both resonance antennas are coupled to each other and thus high efficient energy transfer occurs between the resonance antennas. When a magnetic field corresponding to the resonance frequency occurs between the resonance antennas, the resonance antennas resonate with each other, and thus energy may be generally transmitted with higher efficiency than in the case where a magnetic field generated in the primary coil is radiated to the free space.

The induced power generated by the inductor 321 is amplified at the resonance frequency, and thus a surplus voltage having a voltage difference with respect to the voltage of the power supply unit 310 is reflected and returned due to the generation of the induced power. Particularly, when a distance between the primary coil of the wireless power transmission apparatus and the secondary coil of the wireless power reception apparatus is larger, the reflected and returned voltage may be larger. However, the first condenser 322 and the second condenser 323 configured to be disposed at both sides of the inductor 321 as shown in FIG. 3 may reduce a reflected voltage fed back to the power supply unit 310 through the inductor 321. The level of the reflected voltage that is reduced may be adjusted through the adjustment of the capacitances of the first condenser 322 and the second condenser 323, and the reflected voltage may be minimized by optimizing the adjustment of the capacitances.

The detection circuit 330 measures a current or voltage flowing through the inductor 321. The current measured by the detection circuit 330 may be an alternating current. The detection circuit 330 may be a current sensor or a voltage sensor. The detection circuit 330 may correspond to the measurement circuit 240 shown in FIG. 2, or may constitute a part of the measurement circuit 240.

Meanwhile, the detection circuit 330 may receive power data corresponding to a power value from the wireless power reception apparatus, may measure a current or voltage flowing through the inductor 321, and may generate a control signal for controlling the power supply unit 310 based on the power data and the current or voltage.

On the other hand, the third condenser 324 and the fourth condenser 325 are configured between the inductor 321 and the detection circuit 330. In other words, the third and fourth condensers 324 and 325 may be disposed at both ends of the inductor 321 or at both ends of the detection circuit 330, respectively. Thus, the third and fourth condensers 324 and 325 are configured to apply required signals to the detection circuit 330. The third condenser 324 and the fourth condenser 325 may have the same capacitance value or different capacitance values. Also, the performance of the detection circuit 330 can be improved by optimizing the capacitances of the third condenser 324 and the fourth condenser 325.

Meanwhile, the wireless power transmission apparatus 300 may further include an impedance matcher (not shown). The impedance matcher may perform impedance matching. The impedance matcher may include a switching element for switching all or a portion of the inductor 321, and the first to fourth condensers 322, 323, 324 and 325. The impedance matching may be performed by detecting a reflection signal of wireless power transmitted through the wireless power transmission apparatus 300, switching the switching elements based on the detected reflection signal and thus adjusting the connection state of the first to fourth condensers 322, 323, 324 and 325 or the inductors 321. Alternatively, the impedance matching may be performed by adjusting the capacitances of the first to fourth condensers 322, 323, 324 and 325 or adjusting the inductance of the inductor 321.

Figure 4:
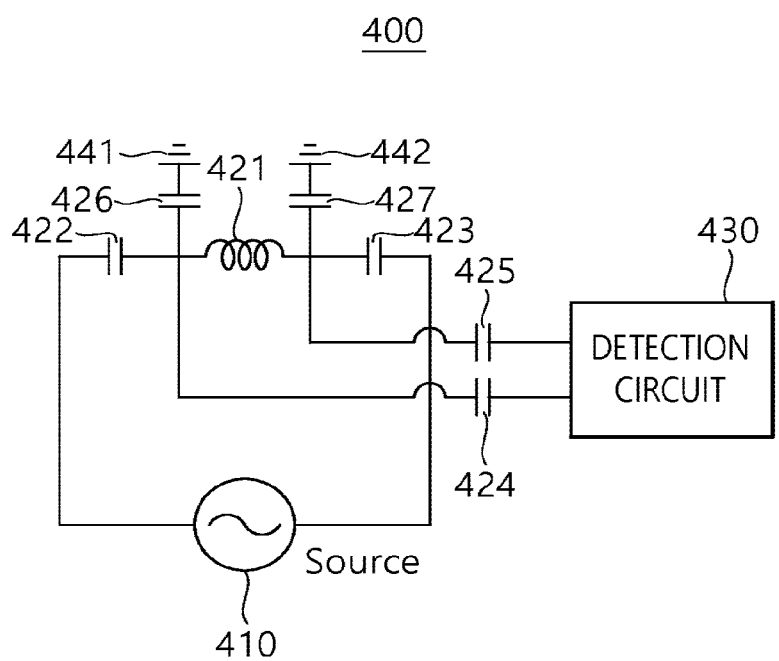
FIG. 4 is a view illustrating a wireless power transmission apparatus according to still another embodiment of the present invention.

FIG. 4 is a view illustrating a wireless power transmission apparatus 400 according to still another embodiment of the present invention. The wireless power transmission apparatus 400 may constitute a part of the wireless power transmission apparatus 200 shown in FIG. 2. Referring to FIG. 4, the wireless power transmission apparatus 400 may include a power supply unit 410, an inductor 421, first to sixth condensers 422, 423, 424, 425, 426 and 427 and a detection circuit 430.

The power supply unit 410 supplies power necessary for driving the wireless power transmission apparatus 400. The supplied power may be an Alternating Current (AC) or an AC voltage.

The inductor 421 may correspond to the primary coil of the primary core 210 shown in FIG. 2, or may constitute a part of the primary core 210.

The inductor 421 may correspond to the primary coil of the primary core 210 shown in FIG. 2, or may constitute a part of the primary core 210. Meanwhile, the first to sixth condensers 422, 423, 424, 425, 426 and 427 may be defined as first to sixth capacitors.

Referring to FIG. 4, the first condenser 422 and the second condenser 423 are configured in opposite directions to each other between the inductor 421 and the power supply unit 410. In other words, the first and second condensers 422 and 423 may be configured at both ends of the inductor 421 or at both ends of the power supply unit 410. The first condenser 422 and the second condenser 423 may have the same capacitance, or may have different capacitances.

The inductor 421, the first condenser 422, and the second condenser 423 may constitute a resonance antenna. In this case, the resonance frequency of the resonance antenna is determined by the inductance of the inductor 421 and the capacitance(s) of the first condenser 422 and the second condenser 423.

Meanwhile, the third condenser 424 and the fourth condenser 425 may also be used to constitute the resonance antenna. In this case, the resonance frequency of the resonance antenna is determined by the inductance of the inductor 421 and the capacitances of the first to fourth condensers 422, 423, 424 and 425.

In addition, the fifth condenser 426 and the sixth condenser 427 may also be used to constitute the resonance antenna. In this case, the resonance frequency of the resonance antenna is determined by the inductance of the inductor 421 and the capacitances of the first to sixth condensers 422, 423, 424, 425, 426 and 427.

The power transmission of the wireless power transmission apparatus 400 may be achieved through a resonance phenomenon of a magnetic field. The resonance phenomenon refers to a phenomenon in which when a near-field corresponding to the resonance frequency is generated in one resonance antenna and another resonance antenna is located therearound, both resonance antennas are coupled to each other and thus high efficient energy transfer occurs between the resonance antennas. When a magnetic field corresponding to the resonance frequency occurs between the resonance antennas, the resonance antennas resonate with each other, and thus energy may be generally transmitted with higher efficiency than in the case where a magnetic field generated in the primary coil is radiated to the free space.

As described above, the induced power generated by the inductor 421 is amplified at the resonance frequency, and thus a surplus voltage having a voltage difference with respect to the voltage of the power supply unit 410 is reflected and returned due to the generation of the induced power. Particularly, when a distance between the primary coil of the wireless power transmission apparatus and the secondary coil of the wireless power reception apparatus is larger, the reflected and returned voltage may be larger. However, the first condenser 422 and the second condenser 423 disposed at both sides of the inductor 421 as shown in FIG. 4 may reduce a reflected voltage fed back to the power supply unit 410 through the inductor 421. The level of the reflected voltage that is reduced may be adjusted through the adjustment of the capacitances of the first condenser 422 and the second condenser 423, and the reflected voltage may be minimized by optimizing the adjustment of the capacitances.

The detection circuit 430 measures a current or voltage flowing through the inductor 421. The current measured by the detection circuit 430 may be an alternating current. The detection circuit 430 may be a current sensor or a voltage sensor. The detection circuit 430 may correspond to the measurement circuit 240 shown in FIG. 2, or may constitute a part of the measurement circuit 240.

Meanwhile, the detection circuit 430 may receive power data corresponding to a power value from the wireless power reception apparatus, may measure a current or voltage flowing through the inductor 421, and may generate a control signal for controlling the power supply unit 410 based on the power data and the current or voltage.

On the other hand, the third condenser 424 and the fourth condenser 425 are configured between the inductor 421 and the detection circuit 430. In other words, the third and fourth condensers 424 and 425 may be disposed at both ends of the inductor 421 or at both ends of the detection circuit 430, respectively. Thus, the third and fourth condensers 424 and 425 are configured to apply required signals to the detection circuit 430. The third condenser 424 and the fourth condenser 425 may have the same capacitance value or different capacitance values. Also, the performance of the detection circuit 430 can be improved by optimizing the capacitances of the third condenser 424 and the fourth condenser 425.

The wireless power transmission apparatus 400 may further include a first ground 441 and a second ground 442 for grounding currents from different ends of the inductor 421. Also, the fifth capacitor 426 and the sixth capacitor 427 may be additionally disposed between the inductor 421 and the first ground 441/the second ground 442, respectively, to reduce noises due to the voltage applied to the other capacitors.

Meanwhile, the wireless power transmission apparatus 400 may further include an impedance matcher (not shown). The impedance matcher may perform impedance matching. The impedance matcher may include a switching element for switching all or a portion of the inductor 421, and the first to sixth condensers 422, 423, 424, 425, 426 and 427. The impedance matching may be performed by detecting a reflection wave of wireless power transmitted through the wireless power transmission apparatus 300, switching the switching elements based on the detected reflection wave and thus adjusting the connection state of the first to sixth condensers 422, 423, 424, 425, 426 and 427 or the inductors 421. Alternatively, the impedance matching may be performed by adjusting the capacitances of the first to sixth condensers 422, 423, 424, 425, 426 and 427 or adjusting the inductance of the inductor 421.

Figure 5:
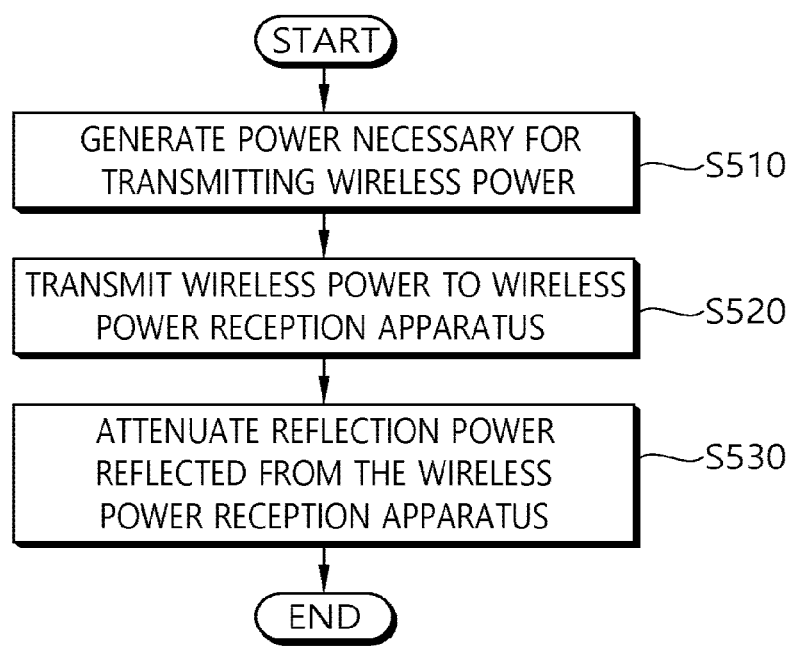
FIG. 5 is a view illustrating a wireless power transmission method of a wireless power transmission apparatus according to an embodiment of the present invention.

FIG. 5 is a view illustrating a wireless power transmission method of a wireless power transmission apparatus according to an embodiment of the present invention.

For an understanding of the invention, a wireless power transmission method according to an embodiment of the present invention shown in FIG. 5 will be described with reference to FIG. 3. Referring to FIG. 3, the wireless power transmission apparatus 300 generates a power source necessary for transmitting wireless power (S510). The power source may be an alternating current (AC), and may be generated from the power supply unit 310.

Next, the wireless power transmission apparatus 300 transmits wireless power to the wireless power reception apparatus (S520). The power transmission of the wireless power transmission apparatus 300 may be achieved through a resonance phenomenon of a magnetic field. The resonance phenomenon refers to a phenomenon in which when a near-field corresponding to the resonance frequency is generated in one resonance antenna and another resonance antenna is located therearound, both resonance antennas are coupled to each other and thus high efficient energy transfer occurs between the resonance antennas. When a magnetic field corresponding to the resonance frequency occurs between the resonance antennas, the resonance antennas resonate with each other, and thus energy may be generally transmitted with higher efficiency than in the case where a magnetic field generated in the primary coil is radiated to the free space.

Next, the wireless power transmission apparatus 300 attenuates the reflection power reflected from the wireless power reception apparatus (S530). In operation S520, The power transmitted from the wireless power transmission apparatus 300 to the wireless power reception apparatus is an induced power that is amplified at the resonance frequency, and thus a surplus voltage having a voltage difference with respect to the voltage of the power supply unit 310 is reflected and returned due to the generation of the induced power. Particularly, when a distance between the primary coil of the wireless power transmission apparatus and the secondary coil of the wireless power reception apparatus is larger, the reflected and returned voltage may be larger. However, the first condenser 322 and the second condenser 323 may be configured to be disposed at both sides of the inductor 321 as shown in FIG. 3, thereby reducing a reflected voltage fed back to the power supply unit 310 through the inductor 321. The level of the reflected voltage that is reduced may be adjusted through the adjustment of the capacitances of the first condenser 322 and the second condenser 323, and the reflected voltage may be minimized by optimizing the adjustment of the capacitances. Although not shown in the drawing, the wireless power transmission method may further include measuring a current or a voltage flowing in the primary coil by the detection circuit 330. The detection circuit 330 may receive power data from the wireless power reception apparatus, and may generate a control signal for controlling the power source based on the power data and the current or voltage flowing in the primary coil.

The third condenser 324 and the fourth condenser 325 may be disposed between the inductor 321 and the detection circuit 330 to apply a required signal to the detection circuit 330.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents. Therefore, the present invention covers all embodiments falling within the scope of the following claims, rather than being limited to the above-described embodiments.

What is claimed is:

1. A wireless power transmission apparatus comprising:
   at least one primary coil configured to wirelessly transmit power from a power source to a wireless power reception apparatus;
   first and second capacitors connected to each end of the primary coil, respectively; and
   a detection circuit configured to measure a current or a voltage associated with the power flowing through the primary coil, wherein the detection circuit receives power data from the wireless power reception apparatus, and generates a control signal for controlling the power source based on the power data and the current or voltage flowing in the primary coil.

2. The wireless power transmission apparatus of claim 1, wherein the first and second capacitors are configured to reduce a reflected power applied from the wireless power reception apparatus to the power source as power is transmitted from the primary coil to the wireless power reception apparatus.

3. The wireless power transmission apparatus of claim 2, further comprising:
   third and fourth capacitors disposed at both ends of the detection circuit or the primary coil, the third and fourth capacitors configured to supply measurement signals from the primary coil to the detection circuit.

4. The wireless power transmission apparatus of claim 3, wherein the primary coil, the first and second capacitors, and the third and fourth capacitors form a resonance antenna, and wherein a resonance frequency of the resonance antenna is based, at least in part on capacitances of the third and fourth capacitors.

5. The wireless power transmission apparatus of claim 3, further comprising:
   an impedance matcher configured to detect a reflected signal of the power transmitted by the primary coil and control a connection state of the first, second, third, or fourth capacitors based on the reflected signal.

6. The wireless power transmission apparatus of claim 3, further comprising first and second grounds connected to both ends of the primary coil.

7. The wireless power transmission apparatus of claim 6, further comprising:
   a fifth capacitor connected between the primary coil and the first ground; and
   a sixth capacitor connected between the primary coil and the second ground.

8. The wireless power transmission apparatus of claim 7, wherein the fifth and sixth capacitors are configured to reduce noise due to a voltage applied to the first and second capacitors.

9. The wireless power transmission apparatus of claim 1, wherein the primary coil and the first and second capacitors form a resonance antenna, and wherein a resonance frequency of the resonance antenna is based on an inductance of the primary coil and capacitances of the first and second capacitors.

10. A wireless power transmission method using a wireless power transmission apparatus, the method comprising:
wirelessly transmitting power from a power source to a wireless power reception apparatus via at least one primary coil of the wireless power transmission apparatus, the wireless power transmission apparatus including first and second capacitors disposed at each end of the primary coil, respectively;
measuring a current or a voltage associated with the power flowing through the primary coil;
receiving power data from the wireless power reception apparatus; and
generating a control signal for controlling the power source based on the power data and the current or voltage flowing in the primary coil.

11. The wireless power transmission method of claim 10, further comprising attenuating reflection power reflected from the wireless power reception apparatus.

12. The wireless power transmission method of claim 11, wherein the attenuating of the reflection power includes reducing the reflection power applied to the power source by the first and second capacitors disposed at each end of the primary coil.

13. The wireless power transmission method of claim 10, wherein the primary coil and the first and second capacitors form a resonance antenna, and wherein a resonance frequency of the resonance antenna is based on an inductance of the primary coil and capacitances of the first and second capacitors.

14. The wireless power transmission method of claim 12, wherein the measuring of the current or voltage includes obtaining a signal from the primary coil via third and fourth capacitors disposed between the primary coil and both ends of a detection circuit configured to measure the current or voltage associated with the power flowing through the primary coil based on the signal.

15. The wireless power transmission method of claim 14, wherein the primary coil, the first and second capacitors, and the third and fourth capacitors form a resonance antenna, and wherein a resonance frequency of the resonance antenna is based, at least in part on capacitances of the third and fourth capacitors.

16. The wireless power transmission method of claim 14, wherein first and second grounds are connected to both ends of the primary coil, a fifth capacitor is connected between the primary coil and the first ground, and a sixth capacitor is connected between the primary coil and the second ground.

* * * * *